Figure 4A:
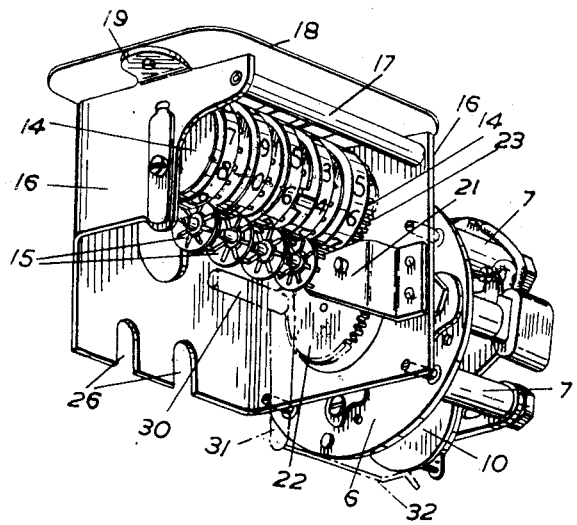

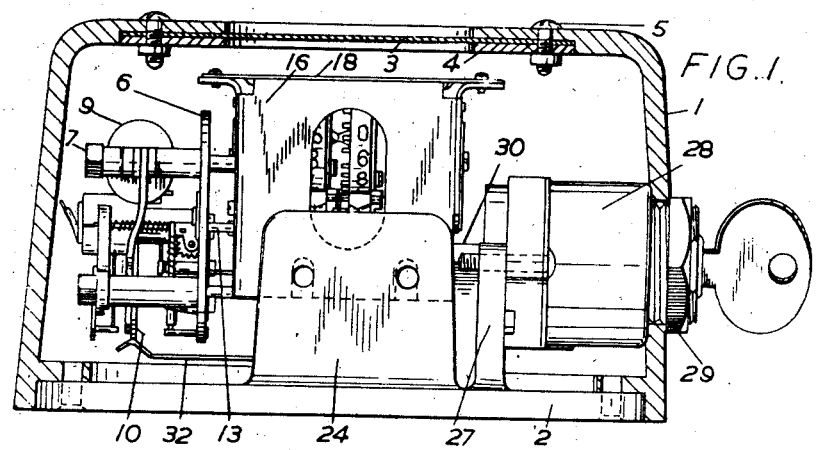
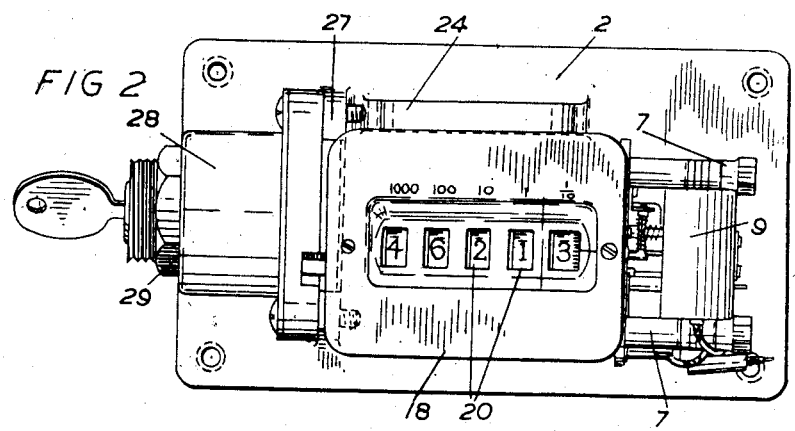
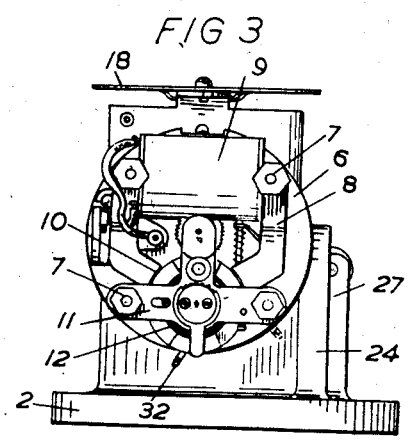

July 29, 1952  J. HEPTINSTALL  2,604,940
TIME AND PERIOD INDICATING DEVICE
Filed Sept. 6, 1950  2 SHEETS—SHEET 2

Inventor:-
John Heptinstall,
By Smith, Michael and Gardiner,
Attorneys

Patented July 29, 1952

2,604,940

UNITED STATES PATENT OFFICE 2,604,940

TIME AND PERIOD INDICATING DEVICE

John Heptinstall, Worthing, England

Application September 6, 1950, Serial No. 183,409
In Great Britain September 15, 1949

13 Claims. (Cl. 161—15)

This invention relates to time- and period-indicating devices.

Much plant and machinery used for industrial and similar purposes requires inspection at periodic intervals in order to effect maintenance, replenish and replace lubricants, check wear, replace worn parts, and effect adjustments necessary to maintain good performance. One example of equipment requiring such periodic inspection consists in the motive means of vehicles e. g. internal combustion or other engines on agricultural tractors and similar vehicles, or in aircraft, marine craft etc. and also stationary and mobile power units, motor-cars, lorries and W. D. vehicles. Another use for the invention is to provide motor-means which will indicate the total time during which an electric current has flowed in an electrical circuit.

The object of the invention is to provide means whereby the operator attending to such equipment can take note of the period which expires after each inspection and thus carry out the succeeding inspection within the desired period of operation of the equipment.

The invention consists in a device for indicating the total time or period of a plurality of successive operations of a power-unit or power driven equipment, comprising a clock movement connected to, and adapted, when running, to drive a counter- and indicator device, and means for ensuring that the clock movement starts and stops respectively when the power-unit or power-driven equipment commences and ceases to function. The clock movement may, for example, be an electrically driven movement of any convenient form, and may be included in the ignition circuit of an I. C. engine (e. g. in an agricultural tractor) or in an electric circuit automatically completed when the engine is running, so that it will measure, in sum, the times of operation of the engine during successive runs. The indicator may comprise a series of inter-geared discs, side by side, with numbered indications on their peripheries, similar to a car mileage indicator connected together by gearing having a ratio 10:1, and driven from the clock movement, so that a total running time up to, say 10,000 hours may be shown thereon. Means may be provided to to reset the indicator to zero, as and when desired, or auxiliary indicating means may be provided, connected to the main indicator, and adapted for such zero resetting, so as to provide a period indication side by side with an indication of total time of operation covering successive inspection periods. If desired warning means, e. g. a coloured lamp, may be provided adapted to be switched on automatically after expiry of a given time period of operation of the equipment and thus notify an attendant that inspection is due.

Figure 4B:
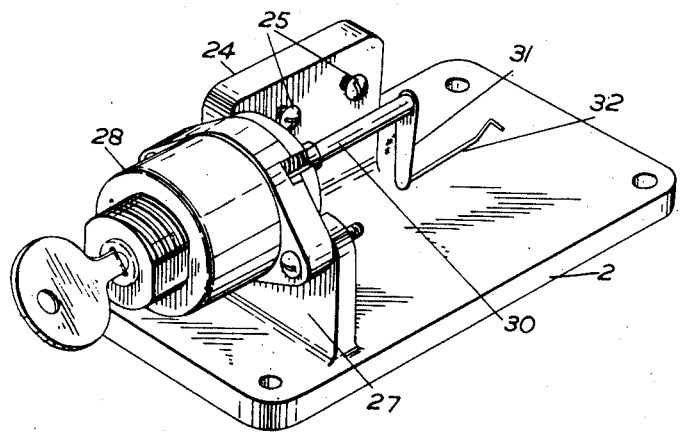

The invention will be clearly understood from the following description of one form (given, however, merely by way of example) which it may assume, and this description will be more readily followed by reference to the accompanying drawings wherein Figure 1 represents in side elevation, with the casing removed, one form of the invention;

Figure 2 represents a plan view, and Figure 3 an end view along the direction shown by the arrow III in Figure 2, of the device shown in Figure 1 with the casing removed; and Figures 4A and 4B show, in perspective, separated parts which when assembled together provide the form of the invention shown in Figures 1, 2 and 3.

In carrying the invention into effect in one convenient manner, as shown in the accompanying drawings, when applied for example to the engine of an agricultural tractor, there may be provided a small box-like metal casing 1 provided with inwardly directed ribs, lugs or the like whereby it can be attached to a baseplate 2. The top of this box may be fitted with a glass or other transparent window, formed by a sheet 3 of transparent material held in a recess of the casing wall by a plate 4 held in position by bolts 5, the casing wall and the holding plate being apertured. Within this casing is mounted a clock movement of any known or suitable kind, adapted to be kept in oscillation by electric or electromagnetic pulses supplied from a suitable battery or other source of power, the timing of the oscillations being controlled by an oscillatory flywheel in the usual manner. The movement is preferably self-starting. Also within the casing and adjacent to the clock movement is mounted a counter and indicator device, connected to and driven by the clock movement, and arranged to show the total time the clock movement has been running at any given observation. Means are further provided whereby the running of the clock is associated with the running of the power unit, e. g. a tractor engine, with which the invention is employed, and such means conveniently comprise a switch in the casing, adapted to be connected in the power-unit ignition circuit, and also adapted to foster the starting of the clock movement when the power-unit ignition circuit is completed for running, and to arrest the operation of the clock movement when the circuit is broken to stop the power-unit.

The aforesaid elements can clearly be seen in the drawings herewith. The clock movement may be of any convenient kind, but is preferably driven by electric power, e. g. from a battery or accumulator, and governed by an oscillatory balance wheel controlled by a hair spring. As seen from Figures 1 and 3 it may comprise a rear plate 6 having upstanding posts 7 which support a magnet 8 having electric windings 9. A balance wheel 10 mounted on a support 11 extending between two of the posts 7 is controlled by a hair spring 12, and controls the driving of gearing of usual kind, for the purpose of driving a centre spindle 13 (Figure 1) extending rearwards through a centre-hole in the rear plate 6.

The counter and indicator device is best seen in Figure 4A and may be of known form comprising five peripherally numbered discs 14 loosely mounted on a common spindle, and a series of double gears 15 loosely mounted on a parallel spindle. One side face of each disc 14 is toothed or pronged, and each double gear 15 is located between, and adjacent to the edges of, two neighbouring discs 14, with which it engages. The teeth or prongs are so selected that a gear 15 only rotates by a small angle after one of the discs 14 with which it engages has performed one complete revolution, and such advance of the gear 15 causes movement of the other disc 14, with which it is engaged, by one tenth part of a complete revolution. Similar 10:1 ratio of movement prevails between successive neighbouring pairs of discs 14. The discs and gears are supported in a casing formed of bent metal sheet 16 held rigid by a riveted rod 17, and an upper cover plate 18 held by screws to out-turned lugs 19 of the sheet 16. The cover plate 18 is provided with window apertures 20 (Figure 2) through which can be observed the numerals displayed from the edges of the discs 14, and this display is located beneath the window 3 of the main casing when the device is assembled.

The posts 7 of the clock movement extend behind the rear plate 6 thereof, and are secured by screws to the sheet 16 as shown in Figure 4A whereby to bring the clock movement and the indicator-counter into operative association. A bracket 21 on the wall of the sheet casing 16 supports one end of the spindle carrying the gears 15, thus providing accommodation beneath the bracket 21 for a gear wheel 22 attached to the end of the centre spindle 13 of the clock movement which projects through an aperture in the metal sheet. A like gear wheel 23 attached, face-to-face, to the endmost disc 14, is in mesh with the gear wheel 22, and it will be seen that the clock drives gear 22, and thereby gear 23 and the endmost counter-disc 14, from which the other discs of the chain are driven at the successive 10:1 reduction ratios as above described. It will be seen therefore that if one disc 14 is referred to as giving unitary indications, the other discs will give readings in values of 10, 100, 1000 and so on. The unitary spindle is geared to the main spindle of the clock movement in such a manner that it performs one complete rotation in one hour, and it will be seen that with five dials the indicator will thus give summation indications up to a maximum of 10,000 hours with an accuracy of reading of 0.1 hour on the primary disc.

The above described assembly of clock movement and counter-indicator may conveniently be mounted on the base plate 2 by quick-release means. For this purpose the base plate is provided with an upstanding block 24 having screws 25 located to receive slots 26 in the bottom edge of the sheet metal casing 16 of the counter. When the slots 26 are engaged on the screws 25, the latter are tightened and hold the assembly securely in position on the base plate 2.

Also upstanding, near to one end of the base plate 2, is an integral support 27 to which is secured by screws a key-controlled switch 28, of any convenient form, for the ignition circuit of the tractor engine. This is so located that its keyholed end projects through an aperture provided in the end wall of the casing 1, and the projecting portion may be externally threaded to receive a nut 29 which assists in locating and securing the assembly in the casing. Electric terminals (not shown) may be mounted in the wall of the casing and internally connected to the ignition switch 28 and/or to the electric terminals of the clock movement. Externally these terminals are connected to the ignition circuit of the tractor engine, and it will be seen that when the ignition is completed by throwing of switch 28, the clock receives current and drives the counter, but is arrested when the switch 28 is opened to stop the engine. Where engine ignition is not from a battery, a separate battery may be provided for the clock movement, and the switch arranged to connect it to, or disconnect it from, the clock respectively when the engine ignition circuit is closed or opened.

In order to ensure or assist starting of the clock movement when the switch is turned on there may be fitted to the cylinder or like part of the key-lock controlling the ignition switch, a spindle 30 projecting into the casing, carrying a radially extending arm 31 with a spring finger 32 the bent tip of which is adjacent to the governing flywheel 10 of the clock movement. This arm is so arranged that when the switch 28 is off the tip of spring finger 32 rides against the balance wheel 10 (Figure 4A) and arrests it, whereas when the switch is turned on it brushes against the edge of the balance wheel and after setting it into oscillation moves out of contact, thus providing a positive starting action for the clock movement.

It should be understood that the invention is not limited solely to the details of the form described above which may be modified, in order to meet various conditions and requirements encountered, without departing in any way from the scope of the invention.

What I claim is:

1. In a total-running-time meter, for a power unit incorporating an electric circuit, of the kind comprising a clock mechanism, and means for driving the clock mechanism while the power unit is in operation, said clock mechanism being operatively connected to a counter and indicator device capable of counting up to at least 100 hours whereby the operating periods of the clock mechanism are totalled and the summation shown on said indicator, the provision of a manually operable electric switch connected in the electric circuit of said power unit, and an abutment secured to and operable by and with said switch, adapted mechanically to impart a starting impulse, and to stop said clock mechanism when the switch is thrown respectively to make and break the electric circuit of said power unit.

2. In a total-running-time meter according to claim 1 the provision of a key-controlled electric switch having said abutment secured thereto.

3. In a total-running-time meter, for a power unit incorporating an electric circuit, of the kind comprising a clock mechanism including a balance wheel, and means for driving the clock mechanism while the power unit is in operation, said clock mechanism being operatively connected to a counter and indicator device capable of counting and indicating up to at least 100 hours whereby the operating periods of the clock mechanism are totalled and the summation shown on said indicator, the provision of a manually operable electric switch connected in the electric circuit of said power unit, and a projecting element secured to said switch, adapted mechanically to engage the balance-wheel of said clock mechanism and thereby arrest operation of the clock mechanism when the switch is thrown to break the electric circuit of said power unit, and mechanically to impose a starting impulse upon said balance wheel as it is disengaged therefrom, thus causing, said clock mechanism to begin to operate, when the switch is thrown to make the electric circuit of said power unit.

4. In a total-running-time meter according to claim 3, the provision, secured to said manually operable electric switch, of a projecting element adapted to make frictional contact with said balance wheel and thereby stop said clock mechanism when the switch is thrown to break the electric circuit of said power unit, and to be moved out of contact with said balance wheel by a brushing movement whereby said wheel is positively set into oscillation, when the switch is thrown to make the electric circuit of said power unit.

5. In a total-running-time meter according to claim 1, a projecting element, secured to said switch, in the form of a spring finger adapted for wiping engagement with the edge of said balance wheel.

6. A total-running-time meter, for a power unit incorporating an electric circuit, comprising, as a unitary assembly in a casing, an electric switch, terminals for connecting said switch in the electric circuit of said power unit, an electrically driven clock mechanism and means for connecting it in the circuit of a source of electric power, said clock mechanism being mechanically connected to a mechanical counter with an associated indicator, said clock actuating the counter to count and indicate the summation of time periods during which the clock mechanism is running, and mechanical means carried by said switch, adapted mechanically to positively start, and to stop, said clock mechanism when said switch is thrown respectively to make and break the electric circuit of said power unit.

7. A total-running-time meter according to claim 6 wherein said electric switch is key-controlled.

8. A total-running-time meter, for a power unit incorporating an electric circuit, comprising, as a unitary assembly in a casing, an electric switch, terminals for connecting said switch in the electric circuit of said power unit, an electrically driven clock mechanism including a balance wheel and means for connecting said clock mechanism in the circuit of a source of electric power, a mechanical counter with an associated indicator adapted to count and indicate up to at least 100 hours, said clock mechanism being mechanically connected to said counter and actuating the latter to count and indicate the summation of time periods during which the clock mechanism is running, and a wiper arm carried by said switch, adapted to engage with said balance wheel to stop said clock mechanism when said switch is thrown to break the electric circuit of said power unit, and to impose a positive starting impulse on said balance wheel as it disengages therefrom, thus restarting said clock mechanism, when said switch is thrown to make said electric circuit.

9. A total-running-time meter, for a power unit incorporating an electric circuit, comprising a base plate, a key-controlled electric switch mounted on said base plate, a supporting casing, an electrically driven clock mechanism secured to said supporting casing, a mechanical counter with an associated indicator adapted to count and indicate up to at least 100 hours, and mechanically connected to and actuated by said clock, means for attaching said supporting casing to said base plate, and mechanical means carried by said switch, and located adjacent to said clock mechanism secured to said supporting casing attached to said base plate, adapted mechanically to impose a starting impulse on, and to stop said clock mechanism when said switch is thrown respectively to make and break the electric circuit of said power unit.

10. A total-running-time meter according to claim 9 wherein said mechanical means comprise a wiper arm projecting from said switch and said clock mechanism includes a balance wheel with which said wiper arm makes frictional contact when said switch is thrown to break said circuit.

11. A total-running-time meter according to claim 9 comprising a closed windowed cover securable to said base plate for enclosing said clock mechanism, said counter and indicator, with said indicator visible through said cover window, and said switch, said cover being provided with only one aperture necessary to allow insertion of said key for controlling said switch.

12. In a total-running-time meter for a power-unit incorporating an electric circuit, of the known kind comprising a switch in said circuit, a clock incorporating a balance wheel operable when said switch closes said circuit, and counter and indicator means to count and indicate the total of successive operating periods of said clock, the provision of a projection carried by and rotatable with said switch, adjacent to said balance wheel, adapted by contact with said balance wheel to transmit mechanically thereto a positive starting impulse thus starting the clock when the switch is thrown to circuit-making position.

13. In a total-running-time meter according to claim 12, the provision, as said projection on said switch, of a spring finger, adapted when said switch is open to frictionally engage said balance wheel, and, when said switch is moved to closing position, to brush against said balance wheel to set the latter into oscillation.

JOHN HEPTINSTALL.

REFERENCES CITED

The following references are of record in the file of this patent:

UNITED STATES PATENTS

| Number | Name | Date |
|---|---|---|
| 1,181,306 | Graham | May 2, 1916 |
| 1,414,910 | Watson | May 2, 1922 |
| 1,446,613 | Bush | Feb. 27, 1923 |
| 1,458,509 | Arthur | July 12, 1923 |
| 1,557,721 | Passamaneck et al. | Oct. 20, 1925 |
| 1,585,806 | Watson | May 25, 1926 |
| 1,795,498 | Mathison | Mar. 10, 1931 |
| 1,814,679 | Fichten | July 14, 1931 |
| 1,848,810 | Watson | Mar. 8, 1932 |
| 2,056,690 | Slye | Oct. 6, 1936 |
| 2,246,538 | Rezsny | June 24, 1941 |
| 2,294,031 | Hobbs et al. | Aug. 25, 1942 |
| 2,325,312 | Follender | July 27, 1943 |
| 2,445,809 | Swezey | July 27, 1948 |
| 2,533,638 | Thornton-Norris | Dec. 12, 1950 |
| 2,543,946 | Tener | Mar. 6, 1951 |
| 2,553,972 | Jensen et al. | May 22, 1951 |
| 2,574,583 | Nallinger | Nov. 13, 1951 |